(12) United States Patent
Wiggeshoff

(10) Patent No.: US 7,461,105 B2
(45) Date of Patent: Dec. 2, 2008

(54) DATA ENTRY METHOD AND APPARATUS

(75) Inventor: Elke Wiggeshoff, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 756 days.

(21) Appl. No.: 10/827,861

(22) Filed: Apr. 20, 2004

(65) Prior Publication Data

US 2005/0231486 A1    Oct. 20, 2005

(51) Int. Cl.
*G06F 3/02*    (2006.01)

(52) U.S. Cl. ..................................... 708/145

(58) Field of Classification Search .................. 708/145
See application file for complete search history.

(56) References Cited

U.S. PATENT DOCUMENTS

| | | | | |
|---|---|---|---|---|
| 4,029,915 A | * | 6/1977 | Ojima | 708/145 |
| 5,508,978 A | | 4/1996 | Kalbermatter et al. | 368/13 |
| 5,515,305 A | * | 5/1996 | Register et al. | 708/145 |
| 5,852,414 A | * | 12/1998 | Yu et al. | 341/22 |
| 6,097,964 A | | 8/2000 | Nuovo et al. | 455/550 |
| 6,173,194 B1 | | 1/2001 | Vanttila | 455/566 |
| 6,483,913 B1 | | 11/2002 | Smith | 379/368 |
| 6,606,486 B1 | | 8/2003 | Cubbage et al. | 455/186.2 |
| 6,643,371 B2 | | 11/2003 | Mager | 379/355.07 |
| 2002/0180708 A1 | | 12/2002 | Kaelbling | 345/169 |
| 2003/0048894 A1 | | 3/2003 | Mager | 379/353 |

* cited by examiner

*Primary Examiner*—David H Malzahn
(74) *Attorney, Agent, or Firm*—Mayer & Williams PC; Karin L. Williams, Esq.

(57) ABSTRACT

On a portable electronic device, multiple-position toggle button data entry keys are provided within the data entry keypad. A controller detects activation of each multiple-position toggle button data entry key on the keypad by a user, and also detects the number of times the data entry key is activated. The controller then accesses a key map in memory to determine the letter or numeric digit selected by the user. All letters and numbers represented on the communication device may be activated with no more than two depressions or activations of a corresponding toggle button.

6 Claims, 7 Drawing Sheets

| NO. OF CLICKS \ DATA ENTRY KEY | 2 | 3 | 4 | ... | 9 |
|---|---|---|---|---|---|
| 1 | A | D | G | | W |
| 2 | B | E | H | | X |
| 3 | C | F | I | | Y |
| 4 | 2 | 3 | 4 | | Z |
| 5 | | | | | 9 |

*FIG. 2*
*(Prior Art)*

| Numeric Input Key | Activation Position | Activation Count | Letter/ Number |
|---|---|---|---|
| "2" | left toggle | 1 | A |
| "2" | center toggle | 1 | B |
| "2" | right toggle | 1 | C |
| "2" | left toggle | 2 | 2 |
| "3" | left toggle | 1 | D |
| "3" | center toggle | 1 | E |
| "3" | right toggle | 1 | F |
| "3" | left toggle | 2 | 3 |
| "4" | left toggle | 1 | G |
| "4" | center toggle | 1 | H |
| "4" | right toggle | 1 | I |
| "4" | left toggle | 2 | 4 |
| "5" | left toggle | 1 | J |
| "5" | center toggle | 1 | K |
| "5" | right toggle | 1 | L |
| "5" | left toggle | 2 | 5 |
| "6" | left toggle | 1 | M |
| "6" | center toggle | 1 | N |
| "6" | right toggle | 1 | O |
| "6" | left toggle | 2 | 6 |
| "7" | left toggle | 1 | P |
| "7" | center toggle | 1 | Q |
| "7" | right toggle | 1 | R |
| "7" | right toggle | 2 | S |
| "7" | left toggle | 2 | 7 |
| "8" | left toggle | 1 | T |
| "8" | center toggle | 1 | U |
| "8" | right toggle | 1 | V |
| "8" | left toggle | 2 | 8 |
| "9" | left toggle | 1 | W |
| "9" | center toggle | 1 | X |
| "9" | right toggle | 1 | Y |
| "9" | right toggle | 2 | Z |
| "9" | left toggle | 2 | 9 |

*FIG. 4*

DATA ENTRY METHOD AND APPARATUS

FIELD OF INVENTION

The present invention relates to a user input mechanism for entering alphanumeric data on a device having relatively few data entry keys, and more particularly to a method and device using a multiple position toggle button keypad to enter alphanumeric data on a portable communication unit.

BACKGROUND OF INVENTION

Portable electronic devices with text entry capabilities are increasing in usage. Cellular phones, for example, have a number of features that require a user to input alphanumeric characters. A user may, for example, enter alphanumeric text in the name field of a phone list maintained in the phone. A user may also use a cell phone to send text messages via short message service (SMS) technology. To do this, a user generally inputs alphanumeric characters into the phone. Typically, a numeric keypad is used to enter alphanumeric characters, where the number of alphanumeric characters exceeds the number of numeric input keys. Keys on the keypad are typically single-pole, single-throw spring-loaded pushbutton switches that remain in a neutral (non-activated) position until momentarily depressed into an activated position.

A technique generally used to enter alphanumeric characters into a telephone uses a standard alphabetic arrangement illustrated on the cellular telephone illustrated in FIG. 1. A cellular phone typically has two data entry modes, a numeric mode and an alphanumeric mode. In the "normal telephone dialing" or "numeric" mode, activation of the data entry keys represents numeric digits. The numeric digits are determined from the correspondence between each data entry key and the numeric digit associated with that key. In a standard telephone, activation of data entry keys in numeric mode generates dual tone multifrequency (DTMF) signals in accordance with an industry standard.

In a known technique, when operating in the alphanumeric mode, single activation of a data entry key is interpreted as a user selection of the first letter in the sequence of letters that are assigned to the particular data entry key. Similarly, when a data entry key is activated twice by a user, this is interpreted as a selection of the second letter in the sequence of letters associated with that particular data entry key. Activation of the data entry key three and four times, respectively, by a user, is interpreted as selection of the third and fourth letters, respectively. Entry of the number as a numerical character is performed by activating the key either four or five times (five times for the "7" and "9" keys that have four letters thereon; and four times for the remaining numbers).

FIG. 2 depicts a key map 215 of such a conventional approach to alphanumeric data entry that illustrates required key activation, when operating in alphanumeric mode. Thus, for example, one activation of the input key corresponding to the number "2" results in a selection of the letter "A", two activations of the input key corresponding to the number "2" results in a selection of the letter "B", three activations of the input key corresponding to the number "2" results in a selection of the letter "C", and four activations of the input key corresponding to the number "2" results in a selection of the numeric digit "2".

A timeout threshold is typically used to determine when selection of a character is complete. If a period of time equal to the timeout threshold follows the activation of a key without a subsequent activation of a key, the selection of the character is considered to be completed. Also, if the user activates a first key followed by an activation of a different key, the activation of the second key is considered to be the beginning of the selection of a new character.

With this method, a user may activate a key one, two, three, four or five times in order to select a particular letter of the alphabet. Multiple activations of keys increase the time required to enter text using the keypad.

Because entry of alphanumeric characters on a limited keypad is less efficient than on a full sized keyboard, a mechanism for improving both accuracy and efficiency is desirable.

SUMMARY OF THE INVENTION

The present invention provides a method and apparatus for entry of alphanumeric characters using a standard number of telephone keys. In one aspect of the invention, the apparatus includes a plurality of multiple-position (three, for example) toggle button data entry keys, a memory having a key mapping, and a processor. The multiple-position data entry keys may be toggle-type switches, rocker-type switches, or any other switch or button that allows for multiple-position entry. The key mapping represents a correspondence between each alphanumeric character, and, a corresponding position (left/center/right for example, for a three-position data entry key) of an activated key and the activation count of the activated data entry key on which the corresponding number or letter is printed. The apparatus also includes a processor coupled to the memory and to each of the multiple-position toggle button data entry keys, the processor receiving signals representing activations of one position of any of the data entry keys and determining a selected character corresponding to the activations of the three-position data entry key, based on the key mapping and the signals representing activation.

These and various other features as well as advantages, which characterize the present invention, will be apparent from a reading of the following detailed description and a review of the associated drawings.

BRIEF DESCRIPTION OF THE DRAWINGS

An embodiment of the present invention will now be fully described, by way of example, with reference to the drawings of which:

FIG. 2 is a table showing the correspondence between data entry keys and activation counts in the conventional communication device of FIG. 1.

FIG. 4 is a functional block diagram showing the correspondence between each of three-position data entry input keys, each activation position, activation count and a corresponding letter/number.

DETAILED DESCRIPTION

An alphanumeric data entry device according to the present invention implements multiple-position data entry keys, such as three-position toggle buttons, and a corresponding key mapping, for the entry of alphanumeric characters. Each letter of the alphabet, and each of numbers zero ("0") through nine ("9") is assigned to an activation position of a corresponding data entry key and a number of activations of the corresponding data entry key, each in accordance with the position of each letter and number of the standard keypad. This advantageously improves the accuracy and efficiency of data entry in requiring less time consuming multiple pressing of each key to input a letter.

In the following description, numerous specific details are set forth/to provide a thorough understanding of embodiments of the invention. Many features are illustrated in use in a cellular telephone, however, all aspects described herein are applicable to any suitable electronic device, such as personal digital assistants (PDAs) and any other hand held electronic devices. In addition, the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" means that a particular feature, structure, or characteristic described in connection with the embodiment is included in at least one embodiment of the present invention. Thus, the appearances of the phrase "in one embodiment" are not necessarily all referring to the same embodiment, though they may. Furthermore, the particular features, structures, or characteristics may be combined in any suitable manner in one or more embodiments.

Figure 6:
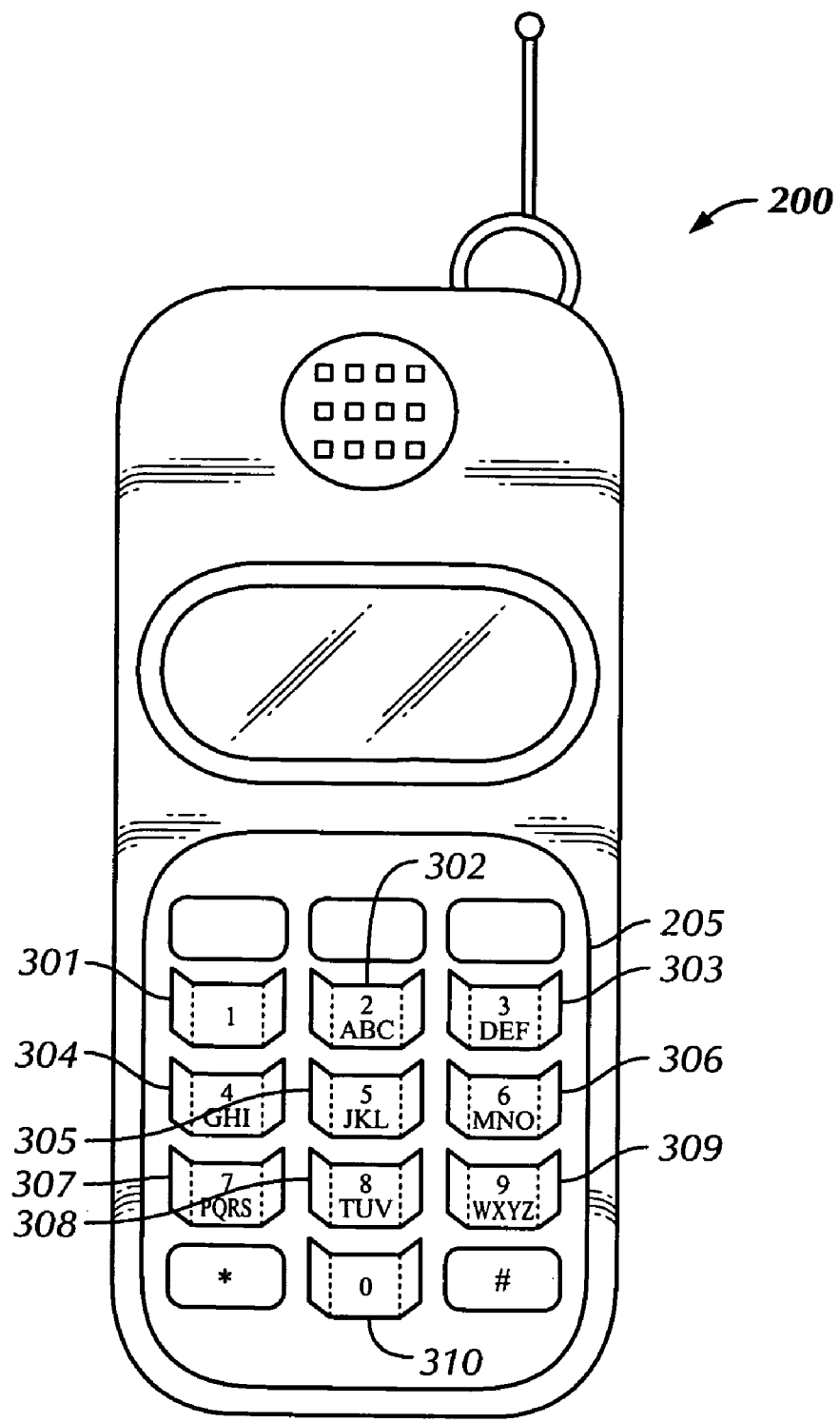
FIG. 6 provides an illustration of a cellular telephone that has multiple-position data entry keys.

FIG. 6 illustrates a cellular phone 200 with a keypad 205 where the twenty-six letters of the English language alphabet, A to Z, are assigned to eight numeric keys having corresponding numbers two to nine. The keypad 205 provides a graphic display of the letters and numeric digits that are assigned to the keys.

Figure 1:
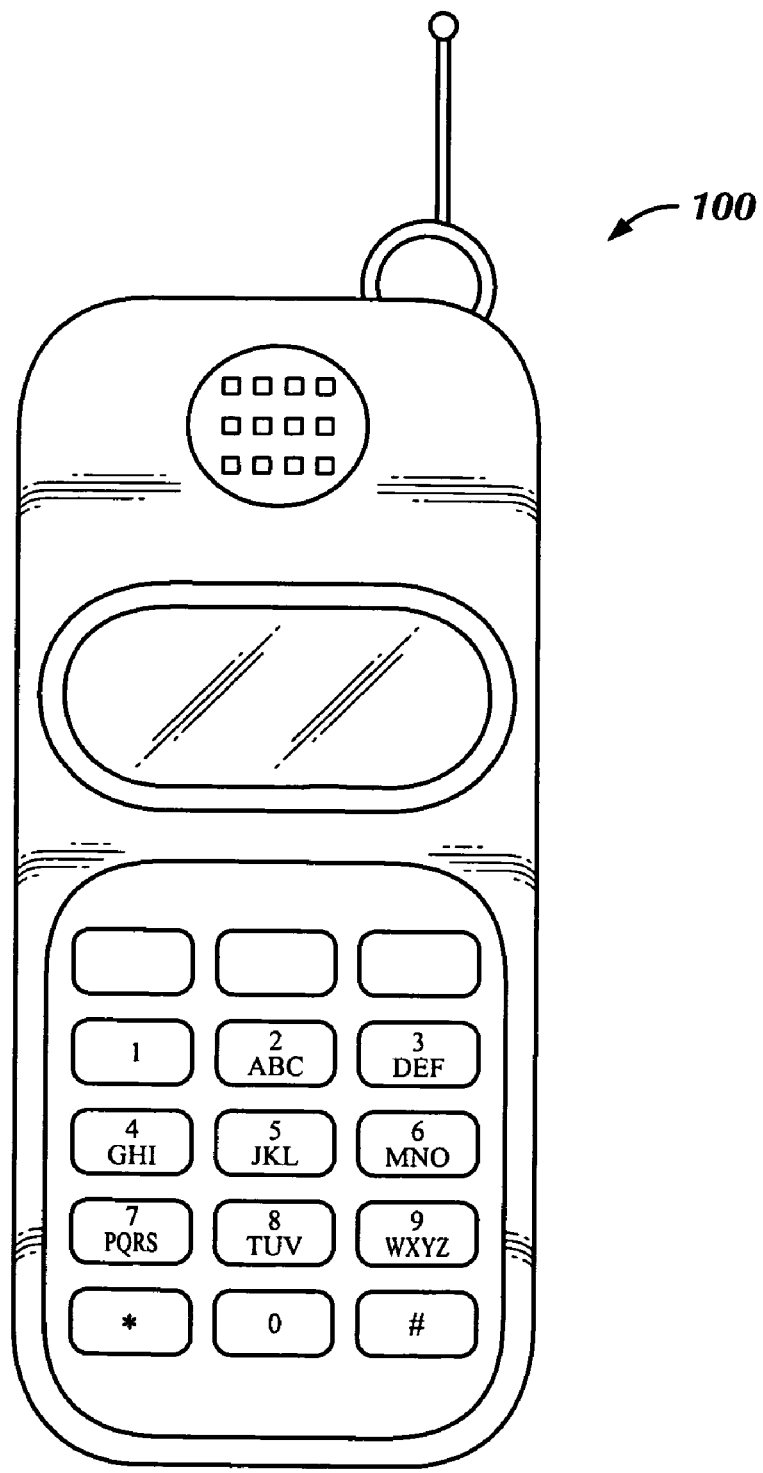
FIG. 1 illustrates a conventional portable communication device.

More specifically, as illustrated in FIG. 6, the letters of the alphabet are typically grouped and associated with each numeric key 302-309 in the following manner. The first three letters of the alphabet are associated with the "2" key 302. The next three letters of the alphabet are associated with the next numeric key in numeric order, specifically the "3" key 303. Each successive three letter grouping is associated with the next numeric key. Two variations to this procedure occur with respect to the "7" key 307 and the "9" key 309. Each of these keys has an associated group of 4 letters. In this manner, the group of letters corresponding to each numeric key is made up of consecutive letters of the alphabet and is equivalent to the illustrated group of letters corresponding to the standard letter-to-key correspondence illustrated in FIG. 1.

Still referring to FIG. 6, in accordance with one embodiment of the present invention, a mobile electronic communication device, specifically a cellular telephone 200, includes three-position toggle button data entry keys. That is, conventional keys 302-309 are replaced with switches, or toggle buttons, that incorporate multiple-position data entry. In accordance with the invention, at least keys 302-309 are "three ("3")-position" toggle buttons (keys 310 and 301 may be conventional data entry keys, or, may also be three-position toggle buttons).

As described herein, a "toggle activation" refers to a depression of a toggle button or switch in any manner that provides an indication that such an activation has been made. For example, for a three-position toggle button that includes "left", "center" and "right" activation positions, depressing that button to the left position creates a signal indicating that such a "left" activation has been made by a user.

In one embodiment of the invention, a "left toggle" activation of a toggle button selects the first letter in the sequence printed on that key, a "center toggle" activation selects the second letter in the predetermined sequence, and a "right toggle" activation selects the third letter in the predetermined sequence. A "left toggle" activation, twice (and before a predetermined time period expires), selects the corresponding number of the key. The keys that include four letters thereon, e.g., the "7" and "9" keys, select the fourth (final) letter by activating the "right toggle" switch twice, again within a predetermined time period (it should be appreciated that the mapping may be applied in any desired manner; for example, the "fourth" letter may be selected by depressing the "left" toggle twice rather than the "right" toggle).

Figure 3A:
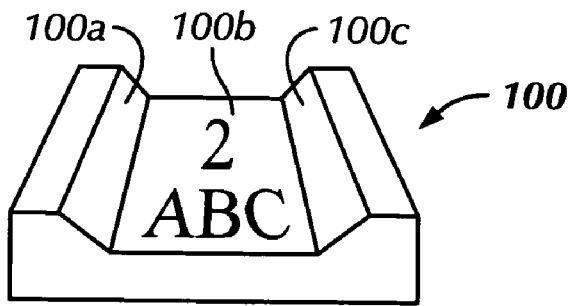
FIGS. 3A-3C are views that illustrate three-position toggle buttons.
Figure 3B:
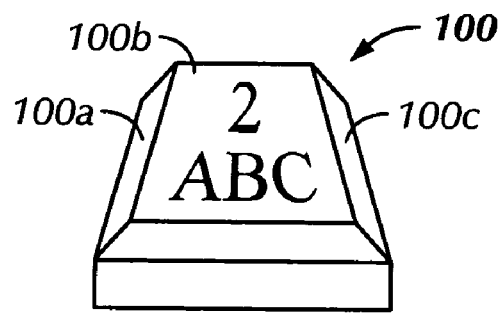
Figure 3C:
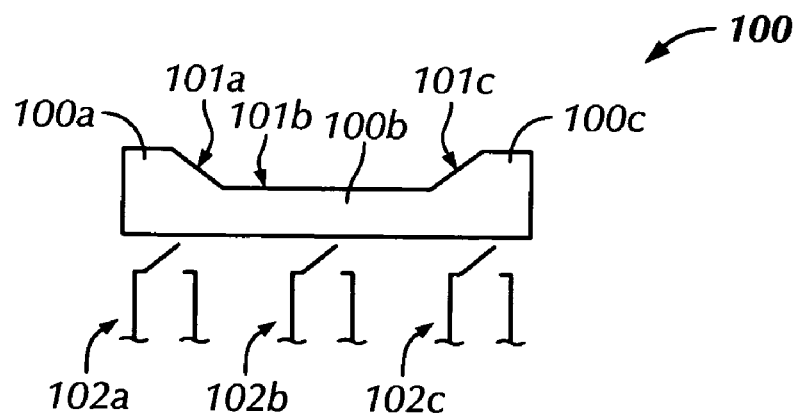

FIG. 3A is a front perspective view of an illustrative three-position toggle button 100. As shown in FIG. 3A, toggle button 100 has a left portion 100a, a center portion 100b (on which a number and letters associated with data entry are printed), and a right portion 100c. Center portion 100b is depicted as being lower than left portion 100a and right portion 100b to provide tactile feedback to a person pressing button 100. Similarly, FIG. 3B is a front perspective view of a second illustrative three position toggle button 100, also having a left portion 100a, a center portion 100b, and a right portion 100c. In FIG. 3B, center portion 100b is shown higher than left portion 100a or right portion 100c to provide tactile feedback. In other embodiments, the entire top surface of button 100 may be flat. FIG. 3C is a combined front elevation view of the button 100 embodiment shown in FIG. 3A and a schematic view of illustrative electrical contacts underlying the button. FIG. 3C illustrates that pressure on left portion surface 101a will cause left portion 100a to be displaced downward into a left activation position, thus closing left contacts 102a while center contacts 102b and right contacts 102c remain open. Likewise, pressure on center portion surface 101b will cause center portion 100b to be displaced downward into a center activation position, thus closing center contacts 102b while left contacts 102a and right contacts 102c remain open. Right contacts 102c are closed using an activation position that is a mirror image of the activation position that closes left contacts 102a. Skilled artisans will understand that FIGS. 3A-3C are illustrative of many multiple position (e.g., single-pole, multi-throw) switch operations. As discussed below, a fourth selection is obtained in one embodiment by consecutively pressing right portion 100c into the right activation position twice in rapid succession. Alternatively, button 100 may be configured to respond to pressure on a third surface (e.g., a top portion or a bottom portion) so as to close a fourth set of contacts (not shown) and thereby obtain the fourth alphanumeric selection with a single press. Button 100 remains in a neutral position if it is not displaced into one of the activation positions.

FIG. 4 illustrates a chart illustrating an embodiment of key mapping stored in memory mapping the three-position toggle buttons to the standard alphabetic/numeric keypad, which corresponds to the exemplary embodiments discussed above—i.e., activating a three-position switch left/center/right, respectively, corresponds to the letters indicated on that key in order. A key that includes a "fourth" letter is depressed right, twice, to activate that letter, and the numbers 2-9 are activated by depressing the three-position toggle key left twice.

Figure 7:
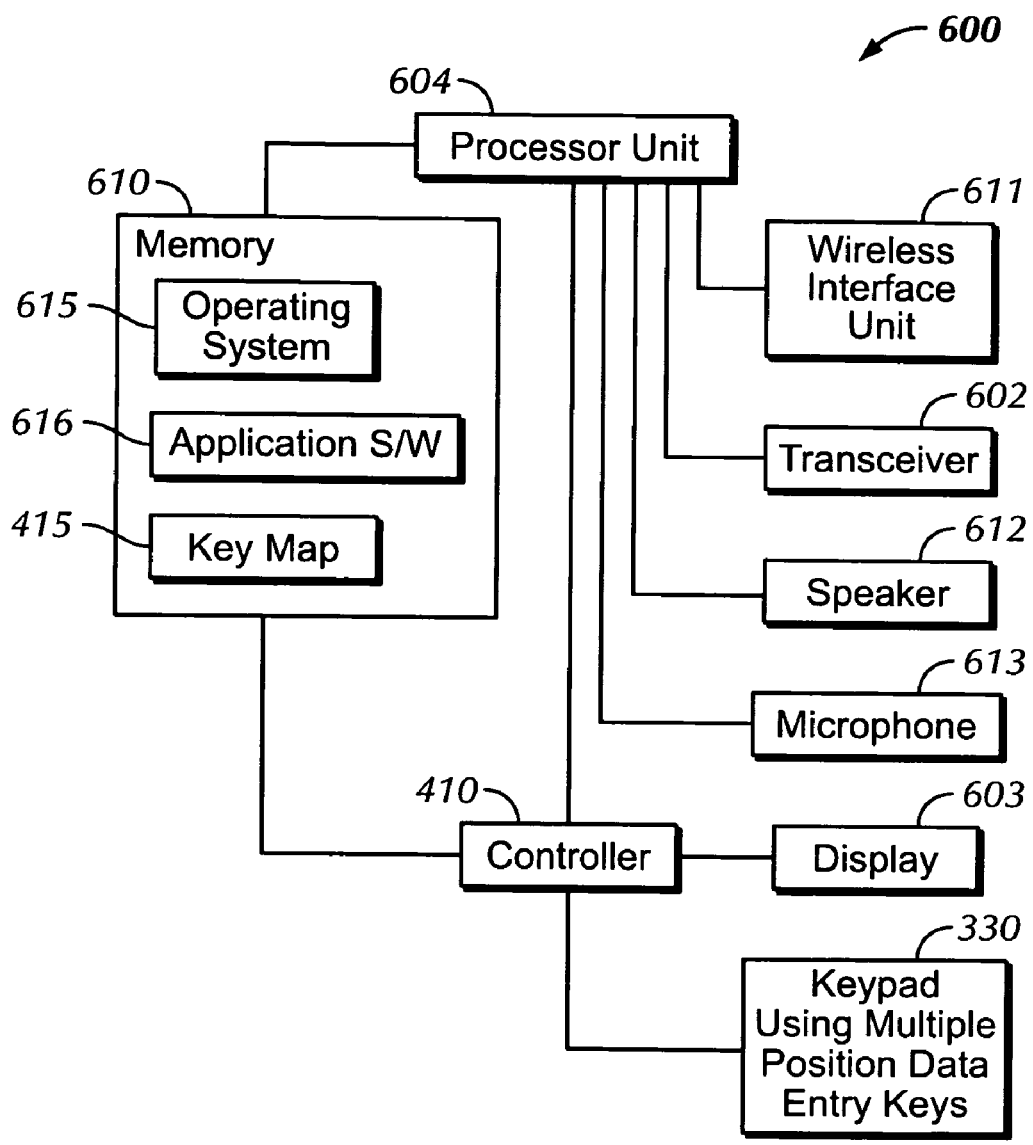
FIG. 7 is a block diagram of an exemplary portable electronic device incorporating the present invention.

FIG. 7 illustrates one embodiment of a mobile electronic communication device 600 incorporating the present invention (again, while cellular telephone 200 of FIG. 6 is one example of a mobile electronic communication device, pagers, PDAs, and handheld messaging devices are additional examples of mobile electronic communications devices within which the present invention can be practiced). The mobile electronic communication device 600 includes a transceiver 602, a display 603, a processor unit 604, a keypad 330, memory 610, a wireless interface unit 611, an audio speaker 612, a microphone 613, an operating system 615, and application software 616. In this exemplary embodiment, operating system 615 and application software 616 are stored in memory 610. In the embodiment illustrated in FIG. 6, memory 610 also stores the key map 415 (such as the mapping embodiment illustrated in FIG. 4). A controller 410 is coupled to the memory 610 and stores the key map 415.

In operation, transceiver 602 is used to receive messages as in known mobile electronic communication devices, for example short message service (SMS), code division multiple access (CDMA), time division multiple access (TDMA), global system for mobile communications (GSM), and general packet radio service (GPRS). The wireless interface unit 611 operates in conjunction with the transceiver 602 to send and receive information. The audio speaker 612 converts the signals received from the transceiver 602 to sound. Display 603 is used to display text and/or images. In one embodiment, display 603 is an LCD. Processor unit 604 stores received message information in the memory 610. Processor unit 604 also controls display 603 to display the stored message information or other data from memory 610.

In one embodiment, the device automatically detects, based on a current task of the user for example, a mode that the device is operating in, i.e., either numeric mode or alphanumeric mode. In numeric mode, activation of each data entry key 301-312 is interpreted as being a numeric input selection. This mode is associated with tasks such as entering a phone number to be dialed, or entering a phone number in a contact list maintained on the device. In one embodiment, when the device is operating in numeric mode, activation of each data entry key 301-312 causes a DTMF signal to be generated. Each data entry key 301-312 has a corresponding DTMF signal, unique among all data entry keys in the keypad 330, and in accordance with an industry standard for DTMF signals. In alphanumeric mode, activation of each alphabetic data entry key 302-309 as described herein is interpreted by the controller 410 as being one of several possible alphanumeric input selections.

In an alternative embodiment, the selection of alphanumeric mode or numeric mode is explicitly performed by a user, using a data entry mode activator, such as a button. A combination of the two mechanisms may be also used, where the data entry mode selector automatically selects a data entry mode based on the user task, and the user has the option of overriding the automatic selection and changing the data entry mode manually. This embodiment is useful, for example, where a user is entering a text message and wants to insert a phone number into the text. By selecting numeric mode while entering text, the entry of a phone number is made easier.

In one embodiment, a shift selector, such as a button or switch, may be provided on the device. The shift selector may be implemented in a variety of ways to allow a user to conveniently enter data in a combination of upper case and lower case.

Figure 5:
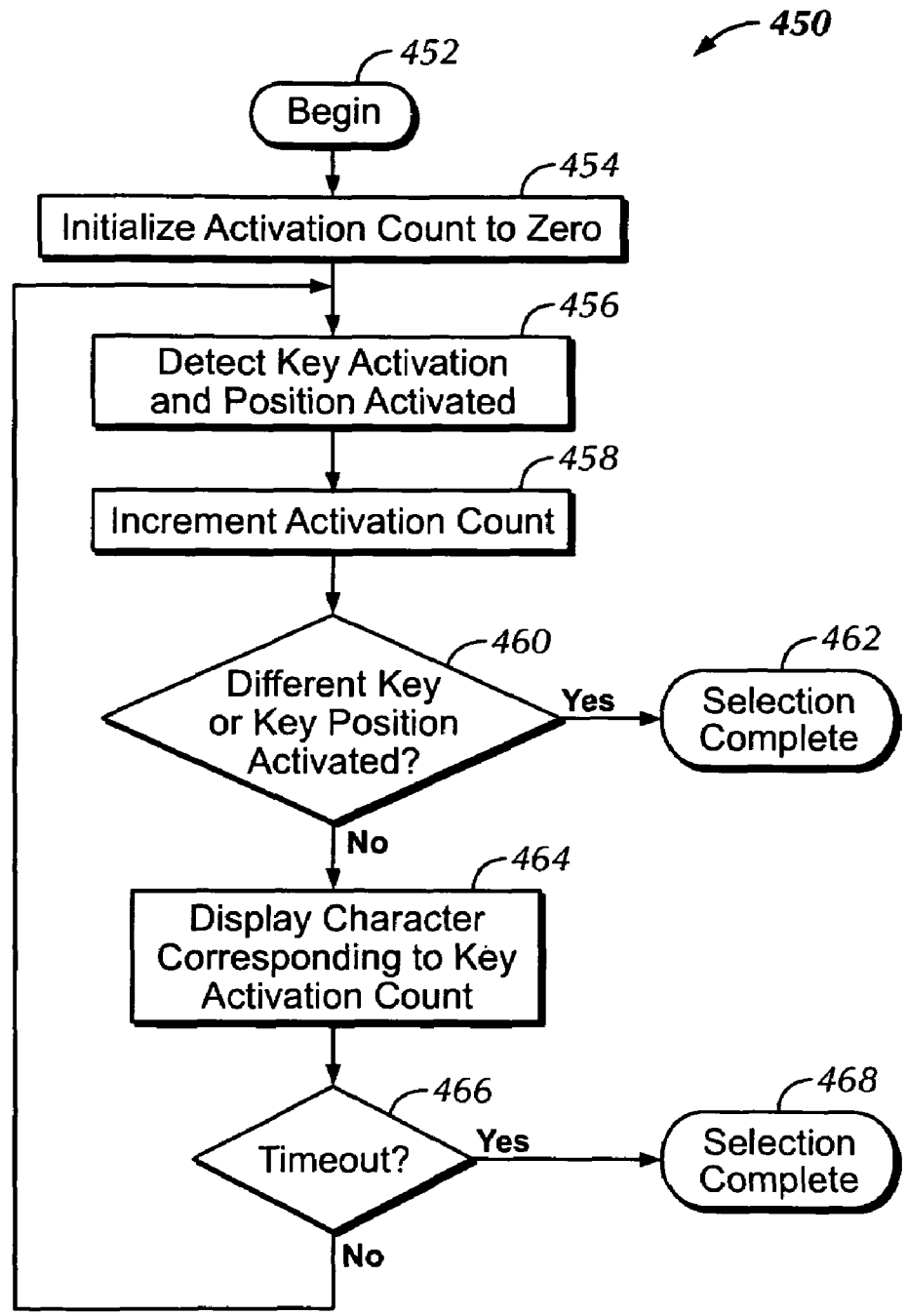
FIG. 5 is a flowchart detailing the operation of a device that includes the three-position data entry keys, such as the toggle button-type data entry buttons of FIG. 3.

FIG. 5 illustrates a process 450 of determining a selected alphanumeric character using the present invention. The process 450 starts at a box 452. At a step 454, an activation count corresponding to the current character selection is initialized to zero. At a step 456, a controller detects an alphanumeric toggle button input key activation has occurred. The controller saves an identifier designating the input key (302-309 in FIG. 6), and the position (left/center/right) that has been activated.

At a step 458, the controller 410 increments the activation count. At a step 460, a determination is made as to whether the input key activated and detected at the step 456 is the same or different from an input key activated during the alphanumeric character selection of the current process 450. The first time the determination 460 is made for a process 450 of selecting an alphanumeric character, the determination is always that a different key has not been activated, and control flow proceeds to a step 464, where a character corresponding to the combination of input key and activation count is displayed.

The character to display at step 464 is determined by using a key map (such as that shown in FIG. 4, for example) that associates each alphanumeric character with a corresponding combination of data input key (302-309), position activated, and activation count. In the key map, each character corresponds to a unique combination of toggle button data input key and activation count. For example, if the left position data input key 303, corresponding to the number three, has been activated one time, the alphanumeric letter "D" is displayed. Note that the letter "D" may be displayed in lower case or upper case, depending on the current shift mode.

After displaying a character at a step 464, a determination is made of whether a next input key activation is made prior to a predetermined timeout threshold elapsing between the prior key activation detection 456 and a next input key activation detection. If a period of time equal to or greater than the predetermined timeout threshold occurs, character selection is complete and flow proceeds to a step 468.

If a next input key activation is made prior to the timeout threshold occurring, flow control loops to the step 456. The steps as described above then repeat. On second and subsequent passes through the sequence of steps 456-466, at the step 460, the determination of whether a different input key has been activated may be positive. If this is true, flow control moves to a step 462, where the alphanumeric character selection is complete. In this situation, after the step 462 and associated processing of the character selection are completed, the process 450 starts again for the new character selection. The key activation detected at the step 456 for the new character is the different key that was detected at the step 460 for the processing of the previous character. The step 460 therefore allows only consecutive activations of an input key to be considered during the process 450 of determining a selected alphanumeric character.

In one embodiment, the key detection at step 456 only proceeds as illustrated when the key detected is one of a limited set of data entry keys. Activation of keys outside of the limited set (for example, keys 310 and 301) are processed outside of the process 450, and flow returns to the step 456 when a key activation within the limited set is detected.

At the step 464, the controller accesses the key map in the memory with an indication of the input key activated by the user, the position of the input key activated (left/center/right), and the number of times the key has been activated, and determines from the key map a tentative character selected by the user. This tentative character is displayed. Upon reaching the completion of the character selection (step 462 or 468), the tentative character becomes the actual character selection. The controller then provides an output signal that indicates the character selected by the user.

In one embodiment, when the data entry mode is explicitly selected by a user, the controller detects the activation and switches between numeric mode and alphanumeric mode. As discussed above, in one embodiment, a data entry mode actuator is not provided, and the mode of operation is determined based on the task that the user is performing. Dependent on the mode of operation of the controller, the activation of the data entry keys are interpreted by the controller either as selection of numeric digits or selection of alphanumeric characters, by the user.

In numeric mode, the activation of a data entry key is interpreted as a numeric selection by the user. In numeric mode, an activation count is not kept, and each input key activation indicates the selection of one digit.

In the alphanumeric mode, the activation of the data entry keys and the number of times a particular data entry key is activated by a user are interpreted as alphanumeric selections by the user.

Although various embodiments are specifically illustrated and described herein, it will be appreciated that modifications and variations of the invention are covered by the above teachings and are within the purview of the appended claims without departing from the spirit and intended scope of the invention. For example, the key mapping illustrated in FIG. 4 is only one embodiment of the present invention. In other embodiments, the precise ordering of alphanumeric characters on each input key may vary from the illustrated one, and still achieve benefits of the present invention, by implementing multiple-position data entry keys in the button keypads. In addition, two position or four position toggle buttons could also be employed. Also, the keys that do not conventionally include alphabetic letters printed thereon may also be used to toggle button entry various symbols or to execute spacing or capitalization for example. Of course these examples should not be interpreted to limit the modifications and variations of the invention covered by the claims but are merely illustrative of possible variations.

What is claimed is:

1. A data entry method comprising:
   receiving a signal representing activation of a particular one of at least two activation positions of a keypad key;
   using the received signal to identify a unique character in a set of characters;
   detecting two or more consecutive activations of the particular activation position; and
   using the number of detected activations to identify the unique character;
   wherein the key, the activation position, the detected activations, and the unique character are mapped as follows:

| Keypad Key | Activation Position | Detected Activations | Character |
|---|---|---|---|
| "2" | left toggle | 1 | A |
| "2" | center toggle | 1 | B |
| "2" | right toggle | 1 | C |
| "2" | left toggle | 2 | 2 |
| "3" | left toggle | 1 | D |
| "3" | center toggle | 1 | E |
| "3" | right toggle | 1 | F |
| "3" | left toggle | 2 | 3 |
| "4" | left toggle | 1 | G |
| "4" | center toggle | 1 | H |
| "4" | right toggle | 1 | I |
| "4" | left toggle | 2 | 4 |
| "5" | left toggle | 1 | J |
| "5" | center toggle | 1 | K |
| "5" | right toggle | 1 | L |
| "5" | left toggle | 2 | 5 |
| "6" | left toggle | 1 | M |
| "6" | center toggle | 1 | N |
| "6" | right toggle | 1 | O |
| "6" | left toggle | 2 | 6 |
| "7" | left toggle | 1 | P |
| "7" | center toggle | 1 | Q |
| "7" | right toggle | 1 | R |
| "7" | right toggle | 2 | S |
| "7" | left toggle | 2 | 7 |
| "8" | left toggle | 1 | T |
| "8" | center toggle | 1 | U |
| "8" | right toggle | 1 | V |
| "8" | left toggle | 2 | 8 |
| "9" | left toggle | 1 | W |
| "9" | center toggle | 1 | X |
| "9" | right toggle | 1 | Y |
| "9" | right toggle | 2 | Z |
| "9" | left toggle | 2 | 9. |

2. The method of claim 1, wherein the keys comprise keys on a telephone keypad.

3. the method of claim 1, further comprising displaying the unique character on a display.

4. A portable electronic device, wherein said device is programmed to perform the data entry method of claim 1.

5. The device of claim 4, wherein said portable electronic device is a telephone.

6. The device of claim 4, wherein said portable electronic device is a personal digital assistant.

* * * * *